(12) United States Patent
Hayasaka et al.

(10) Patent No.: US 11,834,011 B2
(45) Date of Patent: Dec. 5, 2023

(54) SENSOR CLEANING SYSTEM, SENSOR CLEANING METHOD, AND VEHICLE

(71) Applicant: TOYOTA JIDOSHA KABUSHIKI KAISHA, Toyota (JP)

(72) Inventors: Shoichi Hayasaka, Atsugi (JP); Hiromitsu Urano, Numazu (JP); Shuichi Yoshikawa, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 45 days.

(21) Appl. No.: 17/586,224

(22) Filed: Jan. 27, 2022

(65) Prior Publication Data

US 2022/0306046 A1    Sep. 29, 2022

(30) Foreign Application Priority Data

Mar. 29, 2021  (JP) .................................. 2021-055529

(51) Int. Cl.
  *B60S 1/48*  (2006.01)
  *B60S 1/56*  (2006.01)

(52) U.S. Cl.
  CPC ................. *B60S 1/481* (2013.01); *B60S 1/56* (2013.01)

(58) Field of Classification Search
  CPC .................................. B60C 1/56; B60C 1/485
  See application file for complete search history.

(56) References Cited

U.S. PATENT DOCUMENTS

| 2015/0019075 | A1* | 1/2015 | Melcher ................ B60S 1/0818 701/36 |
| 2015/0172582 | A1  | 6/2015 | Kiyohara et al. |
| 2020/0047719 | A1* | 2/2020 | Park ........................ B60S 1/56 |

FOREIGN PATENT DOCUMENTS

| JP | 2020-016862 A | 1/2020 |
| WO | 2014/007153 A1 | 1/2014 |

* cited by examiner

*Primary Examiner* — Natasha N Campbell
(74) *Attorney, Agent, or Firm* — Dinsmore & Shohl LLP

(57) ABSTRACT

A sensor cleaning system cleans a sensor surface of an external sensor mounted on a vehicle. Specifically, the sensor cleaning system estimates a water droplet amount of a water droplet adhering to the sensor surface of the external sensor. The sensor cleaning system determines whether a cleaning start condition is satisfied based on the water droplet amount. The sensor cleaning system executes a cleaning process of cleaning the sensor surface when the cleaning start condition based on the water droplet amount is satisfied.

9 Claims, 9 Drawing Sheets

SENSOR CLEANING SYSTEM, SENSOR CLEANING METHOD, AND VEHICLE

CROSS-REFERENCE TO RELATED APPLICATION

This application claims priority to Japanese Patent Application No. 2021-055529 filed on Mar. 29, 2021, incorporated herein by reference in its entirety.

BACKGROUND

1. Technical Field

The present disclosure relates to a technique of cleaning a sensor surface of an external sensor mounted on a vehicle with a cleaning liquid.

2. Description of Related Art

Japanese Unexamined Patent Application Publication No. 2020-016862 (JP 2020-016862 A) discloses an in-vehicle camera. Dirt such as mud adheres to a lens surface of the in-vehicle camera mounted outside a vehicle cabin. When the lens surface of the in-vehicle camera becomes dirty, a recognition performance using the in-vehicle camera deteriorates. Therefore, the cleaning device supplies a cleaning liquid to the lens surface to wash away the dirt on the lens surface.

SUMMARY

Regarding cleaning of the sensor surface of the external sensor mounted on the vehicle with a cleaning liquid, the inventor of the present application has recognized the following issue. That is, once dirt such as mud adhering to the sensor surface has dried and settled, it is difficult to remove the dirt even when the cleaning liquid is sprayed.

One object of the present disclosure is to provide a technique capable of improving a cleaning effect when the sensor surface of the external sensor mounted on the vehicle is cleaned with the cleaning liquid.

A first aspect relates to a sensor cleaning system that cleans a sensor surface of an external sensor mounted on a vehicle. The sensor cleaning system includes one or more processors. The one or more processors: estimates a water droplet amount of a water droplet adhering to the sensor surface; determines whether a cleaning start condition is satisfied based on the water droplet amount; and execute a cleaning process of cleaning the sensor surface when the cleaning start condition based on the water droplet amount is satisfied.

A second aspect relates to a sensor cleaning method for cleaning a sensor surface of an external sensor mounted on a vehicle with a cleaning liquid. The sensor cleaning method includes: an estimation process of estimating a water droplet amount of a water droplet adhering to the sensor surface; a determination process of determining whether a cleaning start condition is satisfied based on the water droplet amount; and a cleaning process of cleaning the sensor surface when the cleaning start condition based on the water droplet amount is satisfied.

A third aspect relates to a vehicle. The vehicle includes: an external sensor; and a sensor cleaning system that cleans a sensor surface of the external sensor with a cleaning liquid. The sensor cleaning system estimates a water droplet amount of a water droplet adhering to the sensor surface, determines whether a cleaning start condition is satisfied based on the water droplet amount, and execute a cleaning process of cleaning the sensor surface when the cleaning start condition based on the water droplet amount is satisfied.

According to the present disclosure, the water droplet amount of the water droplet adhering to the sensor surface of the external sensor is estimated. Then, whether the cleaning start condition is satisfied is determined based on the water droplet amount. That is, the cleaning start condition is set based on "an amount of water droplets containing dirt" rather than "an amount of dirt after the water droplets have dried". Therefore, the necessity of cleaning process is determined before the water droplets containing dirt dry. With this configuration, the water droplets containing dirt can be washed away with the cleaning liquid before the water droplets containing dirt dry. In other words, it is possible to effectively suppress the water droplets containing the dirt from being settled after the water droplets dry. As a result, the cleaning effect is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will be described with reference to the accompanying drawings.

1. Overview

Figure 1:
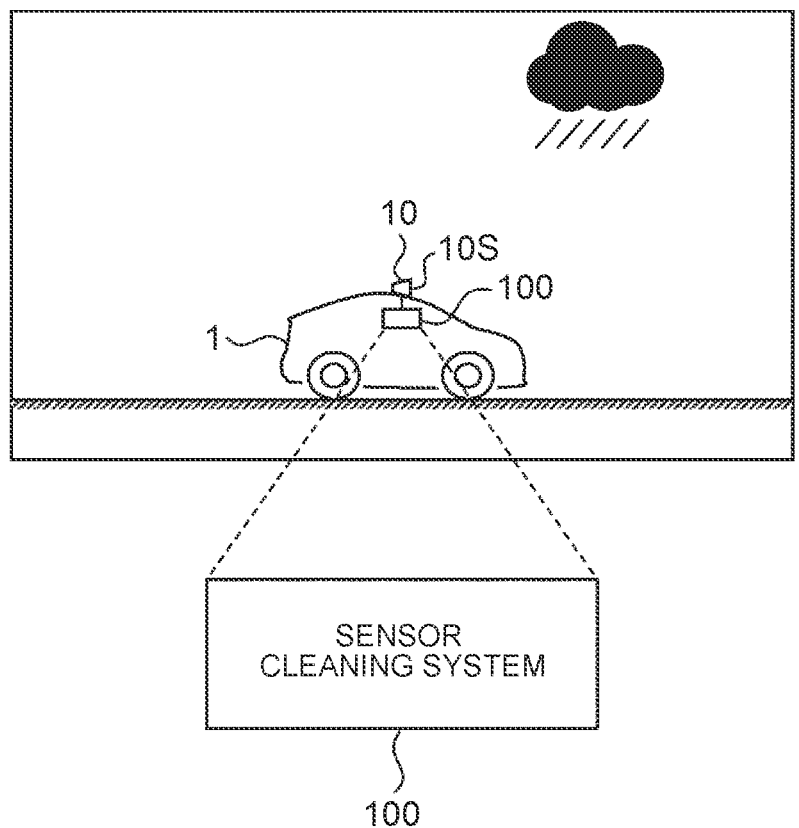
FIG. 1 is a conceptual diagram for explaining an outline of a sensor cleaning system applied to a vehicle according to an embodiment of the present disclosure.

FIG. 1 is a conceptual diagram for explaining an outline of a sensor cleaning system 100 applied to a vehicle 1 according to the present embodiment. The vehicle 1 includes an external sensor (recognition sensor) 10 for recognizing the surrounding situation of the vehicle 1. Examples of the external sensor 10 include a camera, laser imaging detection and ranging (LIDAR) and radar.

A recognition result by the external sensor 10 is used, for example, for vehicle traveling control for controlling traveling of the vehicle 1. Examples of vehicle traveling control include adaptive cruise control (ACC), collision avoidance control, and autonomous driving control. The recognition result by the external sensor 10 can also be used for self-position estimation processing (localization) for estimating the position of the vehicle 1 with high accuracy. The vehicle 1 equipped with the external sensor 10 may be an autonomous driving vehicle.

Hereinafter, a case where the external sensor 10 is mounted outside a vehicle cabin of the vehicle 1 will be considered. In this case, dirt is likely to adhere to a sensor surface 10S of the external sensor 10. Here, the sensor surface 10S is an outer surface of the external sensor 10, and is an optical portion through which light or electromagnetic waves for the sensor function pass. For example, when the external sensor 10 is a camera, the sensor surface 10S is a lens surface. When the lens is covered with a cover glass, the sensor surface 10S is a surface of the cover glass. As another example, when the external sensor 10 is LIDAR, the sensor surface 10S is a surface of a window through which a emitted laser beam or an incident laser beam passes.

For example, in rainy weather, water droplets containing dirt adhere to the sensor surface 10S of the external sensor 10. The water droplets containing dirt are, for example, mud scattered by a preceding vehicle. As another example, the water droplets containing dirt are raindrops that have fallen while entraining dust or dirt in the air. When the water droplets containing the dirt dry, the dirt is settled on the sensor surface 10S.

When dirt adheres to the sensor surface 10S of the external sensor 10, the performance of recognition using the external sensor 10 deteriorates. Deterioration of the recognition performance leads to deterioration of accuracy of the vehicle traveling control and self-position estimation. Therefore, it is necessary to clean the sensor surface 10S of the external sensor 10 as needed.

Therefore, the sensor cleaning system 100 is applied to the vehicle 1. The sensor cleaning system 100 determines whether cleaning of the sensor surface 10S of the external sensor 10 is necessary. Then, when the sensor cleaning system 100 determines that cleaning is necessary, the sensor cleaning system 100 executes a cleaning process on the sensor surface 10S. Specifically, the sensor cleaning system 100 cleans the sensor surface 10S by supplying the cleaning liquid to the sensor surface 10S.

The sensor cleaning system 100 is mounted on the vehicle 1, for example. As another example, when the vehicle 1 is remotely assisted or remotely driven, the sensor cleaning system 100 may be split into an in-vehicle system and a remote system. In that case, the remote system may determine whether cleaning is necessary, and the in-vehicle system may execute the cleaning process.

Regarding cleaning of the sensor surface 10S of the external sensor 10 with the cleaning liquid, the inventor of the present application has recognized the following issue. That is, once dirt such as mud adhering to the sensor surface 10S has dried and settled, it is difficult to remove the dirt even when the cleaning liquid is sprayed.

In order to solve this issue, the sensor cleaning system 100 according to the present embodiment executes the cleaning process after water droplets containing dirt adhere to the sensor surface 10S and before the water droplets are completely dried. Hereinafter, a cleaning policy according to the present embodiment will be described in more detail.

2. Cleaning Policy

Figure 2:
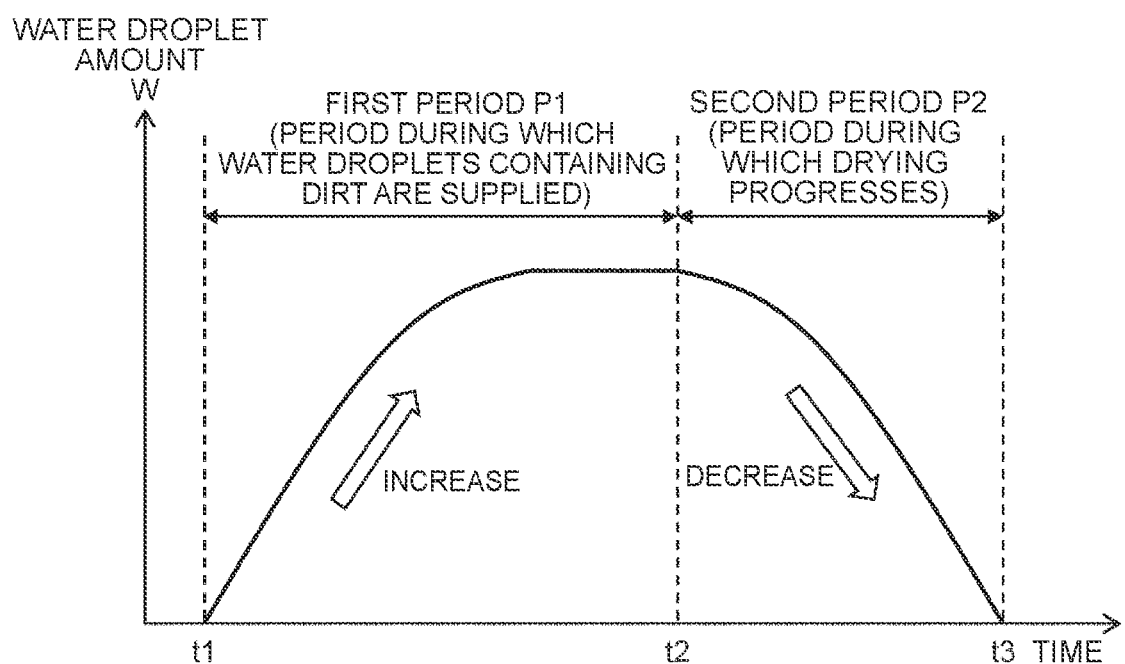
FIG. 2 is a timing chart for explaining a cleaning policy according to the embodiment of the present disclosure.

FIG. 2 is a timing chart for explaining the cleaning policy according to the present embodiment. The horizontal axis represents time, and the vertical axis represents a water droplet amount W adhering to the sensor surface 10S of the external sensor 10. After time t1, water droplets adhere to the sensor surface 10S, and the water droplet amount W increases. At time t2, the water droplet amount W adhering to the sensor surface 10S starts to decrease. At time t3, the water droplet amount W becomes zero.

During a first period P1 from the time t1 to the time t2, the water droplet amount W adhering to the sensor surface 10S increases or does not change. It can be said that the first period P1 is a period during which water droplets containing dirt are supplied to the sensor surface 10S. At least during the first period P1, the water droplets containing dirt do not dry and the dirt does not settle.

On the other hand, during a second period P2 from the time t2 to the time t3, the water droplet amount W decreases. It can be said that the second period P2 is a period during which drying of water droplets containing dirt progresses. Then, at time t3, the water droplets containing dirt are completely dried.

According to the present embodiment, the cleaning process is started before the time t3. However, it is not efficient to start the cleaning process at the stage where almost no water droplets are attached. Therefore, after the water droplet amount W increases up to some extent, the cleaning process is started until the water droplet amount W decreases. A "cleaning start condition" is a condition for starting the cleaning process. Hereinafter, some examples of the cleaning start conditions will be described.

Figure 3:
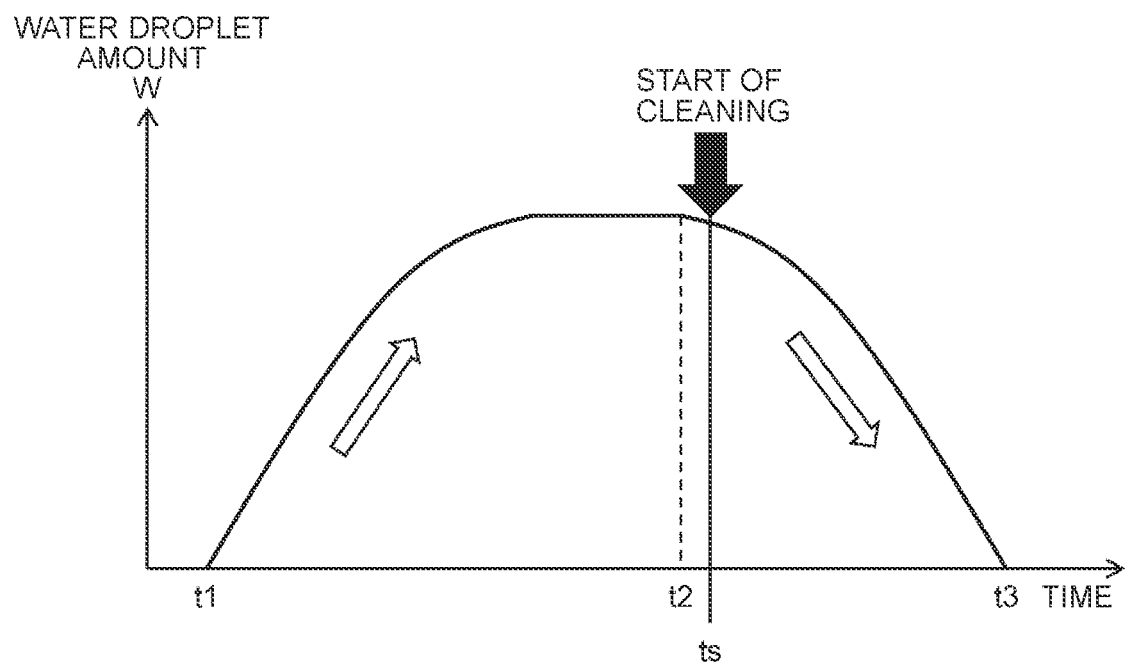
FIG. 3 is a timing chart for explaining a first example of a cleaning start condition according to the embodiment of the present disclosure.

FIG. 3 is a timing chart for explaining a first example of the cleaning start condition. The first example of the cleaning start condition is that "the water droplet amount W changes from an increase to a decrease". As shown in FIG. 3, at time is immediately after time t2, a decrease in the water droplet amount W is detected, and the cleaning process is started. As described above, according to the first example, the cleaning process is started immediately after drying of the water droplets on the sensor surface 10S is started. With this configuration, it is possible to sufficiently suppress settlement of dirt and to efficiently execute the cleaning process.

Figure 4:
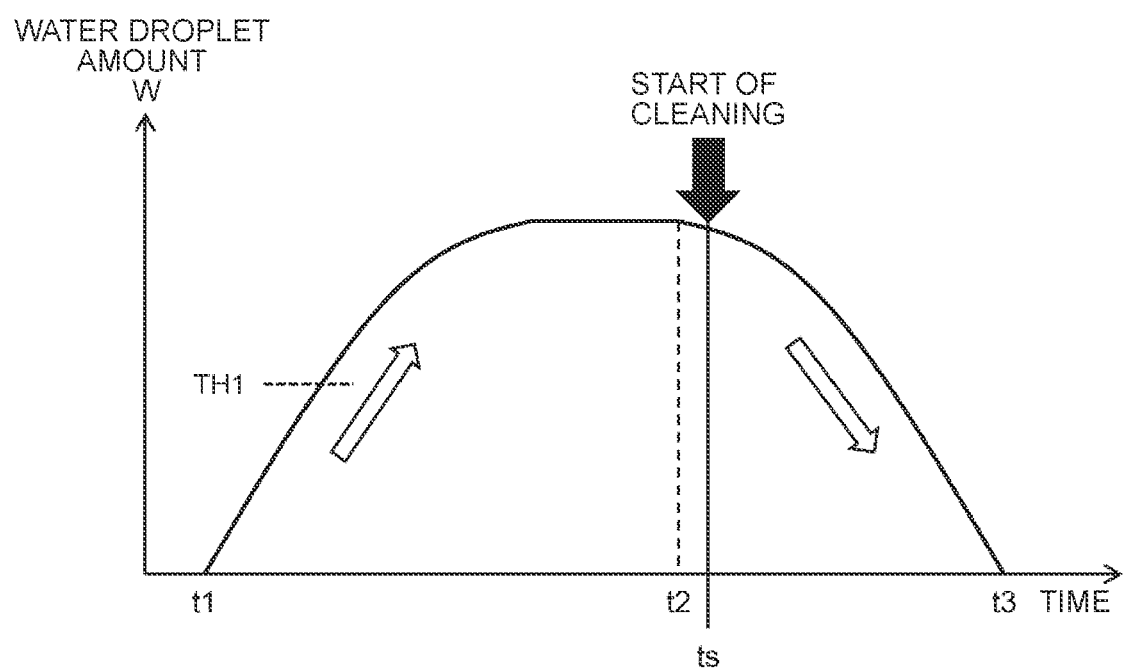
FIG. 4 is a timing chart for explaining a second example of the cleaning start condition according to the embodiment of the present disclosure.

FIG. 4 is a timing chart for explaining a second example of the cleaning start condition. The second example is a modification of the first example. Specifically, the second example of the cleaning start condition is that "the water droplet amount W exceeds a first threshold value TH1 and then changes from an increase to a decrease". The first threshold value TH1 is a value larger than zero. According to the second example, at least the same effect as in the case of the first example can be obtained. Further, excessive operation of the cleaning process is suppressed. For example, it is possible to suppress the cleaning process from being executed when only one or two water droplets adhere to the sensor surface 10S.

Figure 5:
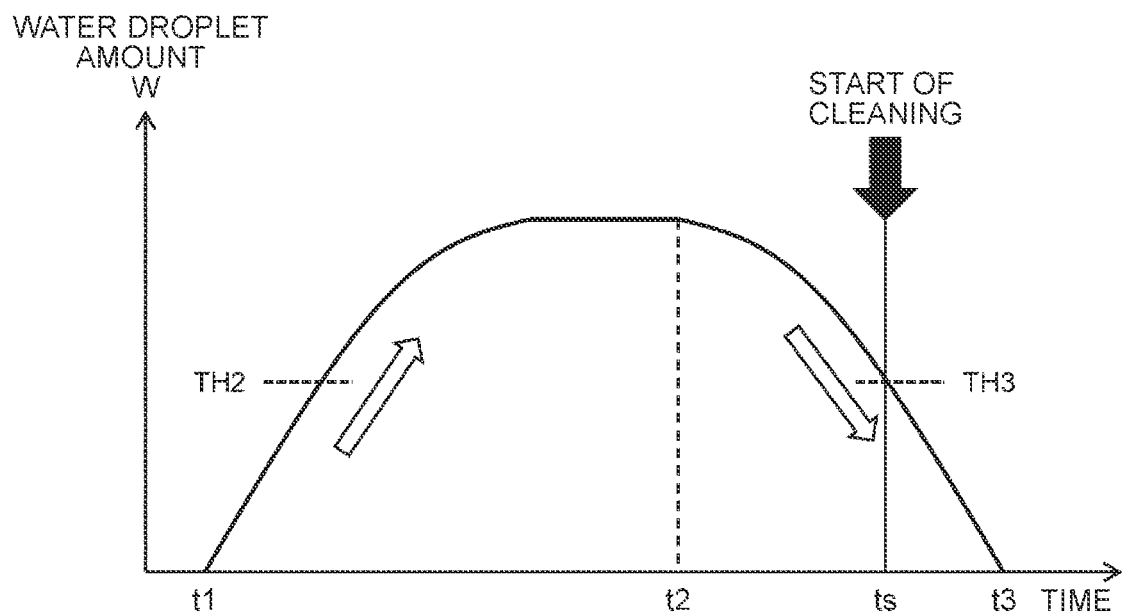
FIG. 5 is a timing chart for explaining a third example of the cleaning start condition according to the embodiment of the present disclosure.

FIG. 5 is a timing chart for explaining a third example of the cleaning start condition. The third example of the cleaning start condition is that "the water droplet amount W exceeds a second threshold value TH2 and then falls below a third threshold value TH3". The second threshold value TH2 and the third threshold value TH3 are values larger than zero. The second threshold value TH2 and the third threshold value TH3 may be set to the same value. The third threshold value TH3 may be set to a value smaller than the second threshold value TH2. According to the third example, the start time ts of the cleaning process may be later than in the case of the first and second examples described above. Even in the above case, the start time ts is before time t3, and the water droplets are not completely dry. Therefore, the effect can be sufficiently obtained.

In the case of the first to third examples shown above, the cleaning process is started while the water droplet amount W is decreasing after the water droplet amount W increases. That is, it can be said that the cleaning start condition is that "the water droplet amount W is decreasing after the water droplet amount W increases".

Figure 6:
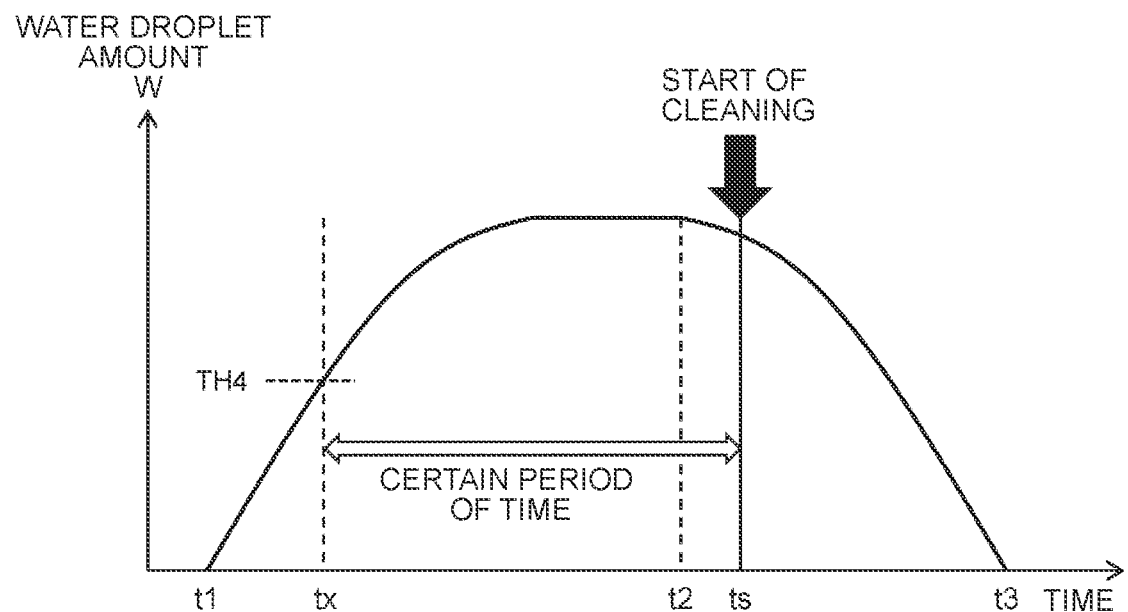
FIG. 6 is a timing chart for explaining a fourth example of the cleaning start condition according to the embodiment of the present disclosure.

FIG. 6 is a timing chart for explaining a fourth example of the cleaning start condition. The fourth example of the cleaning start condition is that "a certain period of time elapses after the water droplet amount W exceeds a fourth threshold value TH4". The fourth threshold value TH4 is a value larger than zero. The certain period of time is set shorter than the time generally required for the water droplets to dry. In the example shown in FIG. 6, the water droplet amount W exceeds the fourth threshold value TH4 at time tx. The start time is of the cleaning process is a time after the time tx by the certain period of time. Also according to the fourth example, it is possible to sufficiently suppress settlement of dirt and to efficiently execute the cleaning process.

As described above, according to the present embodiment, the cleaning start conditions for starting the cleaning process include "water droplet amount W". In other words, the cleaning start conditions are set based on "an amount of water droplets containing dirt" rather than "an amount of dirt after the water droplets have dried". It can be said that the present embodiment focuses on "potential dirt contained in water droplets" rather than "explicit dirt after the water droplets dry". Since such cleaning start conditions are used, the necessity of cleaning process is determined before the water droplets containing dirt dry. With this configuration, the water droplets containing dirt can be washed away with the cleaning liquid before the water droplets containing dirt dry. In other words, it is possible to effectively suppress the water droplets containing the dirt from being settled after the water droplets dry. As a result, the cleaning effect is improved.

The inventor of the present application confirmed through experiments that the cleaning effect of the present embodiment was improved.

Further, according to the present embodiment, it is not necessary to increase a cleaning liquid pressure or a cleaning liquid flow rate. Therefore, existing products can be used as pumps and nozzles for supplying the cleaning liquid. This is preferable from the viewpoint of cost reduction.

Hereinafter, the sensor cleaning system 100 according to the present embodiment will be described in further detail.

3. Configuration Example of Sensor Cleaning System

Figure 7:
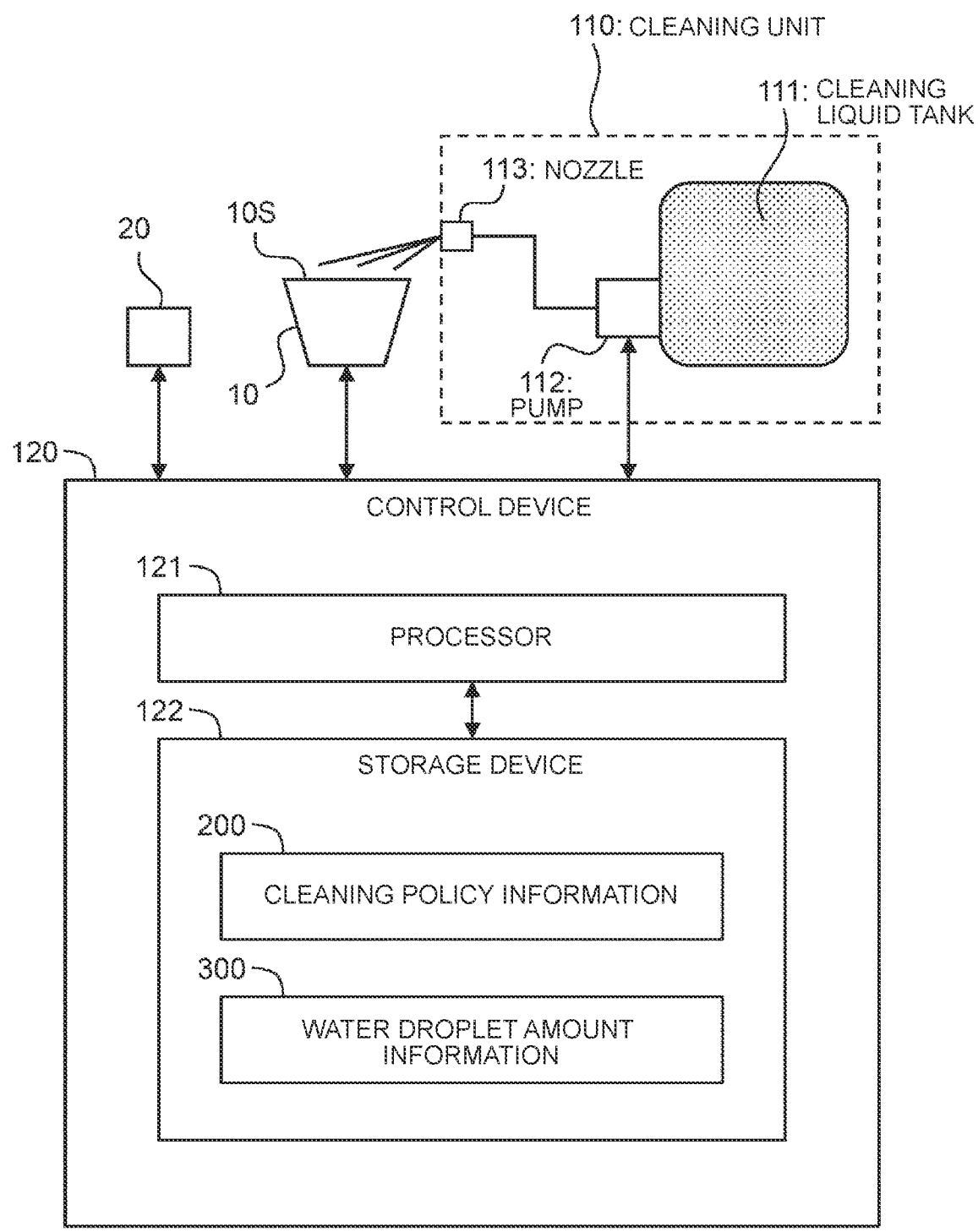
FIG. 7 is a block diagram showing a configuration example of the sensor cleaning system according to the embodiment of the present disclosure.

FIG. 7 is a block diagram showing a configuration example of the sensor cleaning system 100 according to the present embodiment. The sensor cleaning system 100 includes a cleaning unit 110 and a control device 120.

The cleaning unit 110 is mounted on the vehicle 1. The cleaning unit 110 includes a cleaning liquid tank 111, a pump 112, and a nozzle 113. The cleaning liquid is stored in the cleaning liquid tank 111. The pump 112 sends the cleaning liquid stored in the cleaning liquid tank 111 to the nozzle 113. The nozzle 113 is located in the vicinity of the external sensor 10, and injects the cleaning liquid toward the sensor surface 10S of the external sensor 10.

The control device 120 controls the cleaning unit 110 to execute the cleaning process. Specifically, the control device 120 supplies the cleaning liquid to the sensor surface 10S of the external sensor 10 by operating the pump 112 to clean the sensor surface 10S.

More specifically, the control device 120 includes one or more processors 121 (hereinafter, simply referred to as processor 121) and one or more storage devices 122 (hereinafter, simply referred to as storage device 122). The processor 121 executes various processes. For example, the processor 121 includes a central processing unit (CPU). The storage device 122 stores various types of information. Examples of the storage device 122 include a volatile memory, a non-volatile memory, a hard disk drive (HDD), and a solid state drive (SSD). When the processor 121 executes a control program that is a computer program, the processing by the control device 120 is realized. The control program is stored in the storage device 122 or recorded on a computer-readable recording medium. The control device 120 may include one or a plurality of electronic control units (ECUs).

The storage device 122 stores cleaning policy information 200. The cleaning policy information 200 indicates a cleaning start condition for starting the cleaning process (see FIGS. 3 to 6).

The processor 121 performs an "estimation process" for estimating the water droplet amount W adhering to the sensor surface 10S of the external sensor 10. For example, the processor 121 receives information indicating the measurement result by the external sensor 10, and estimates the water droplet amount W based on the information.

For example, when the external sensor 10 is a camera, the processor 121 receives the image information captured by the camera. When water droplets adhere to the sensor surface 10S, portions in the image to which the water droplets adhere are blurred. As the water droplet amount W of the water droplets adhering to the sensor surface 10S increases, the area of blurred portions in the image becomes larger. Therefore, it is possible to estimate the water droplet amount W by analyzing the image information. The water droplet amount W may be estimated from the image information using a learning model generated through machine learning such as deep learning.

As another example, when the external sensor 10 is LIDAR, the processor 121 receives the measurement result by LIDAR. The measurement result by LIDAR includes a distribution of the distances to reflection points of the laser beam. When water droplets adhere to the sensor surface 10S, the laser beam is reflected from the water droplets adhering to the sensor surface 10S, in addition to an object away from the vehicle 1. As a result, the reflection points are scattered and the variance of the distance distribution becomes large. Therefore, the water droplet amount W can be estimated by analyzing the distance distribution obtained by LIDAR.

As yet another example, the water droplet amount W may be estimated using another in-vehicle sensor 20 different from the external sensor 10. For example, the in-vehicle sensor 20 is a rain sensor that detects a rainfall state. In this case, the processor 121 may estimate the water droplet amount W adhering to the sensor surface 10S based on the rainfall state detected by the rain sensor.

As yet another example, the in-vehicle sensor 20 may be a camera that captures an image of the sensor surface 10S of the external sensor 10 from the outside. In this case, the processor 121 may estimate the water droplet amount W by analyzing the image of the sensor surface 10S captured by the camera.

Water droplet amount information 300 indicates the water droplet amount W estimated as described above. The water droplet amount information 300 is stored in the storage device 122.

The processor 121 executes a "determination process" of determining whether the cleaning start condition indicated by the cleaning policy information 200 is satisfied based on the water droplet amount W indicated by the water droplet amount information 300. When the cleaning start condition based on the water droplet amount W is satisfied, the processor 121 executes the "cleaning process" of cleaning the sensor surface 10S of the external sensor 10 with the cleaning liquid. Specifically, the processor 121 operates the pump 112 to supply the cleaning liquid to the sensor surface 10S of the external sensor 10 and clean the sensor surface 10S.

The control device 120 is mounted on the vehicle 1, for example. As another example, when the vehicle 1 is remotely assisted or remotely driven, the control device 120 (the processors 121 and the storage devices 122) may be split into the in-vehicle system and the remote system. In the latter case, for example, the processor 121 of the remote system receives information from the vehicle 1 via communication and estimates the water droplet amount W. Further, the processor 121 of the remote system determines whether the cleaning start condition is satisfied based on the water droplet amount W. Then, the processor 121 of the remote system commands the in-vehicle system to execute the cleaning process. When the processor 121 of the in-vehicle system receives the command, the processor 121 controls the cleaning unit 110 to execute the cleaning process.

4. Processing Flow

Figure 8:
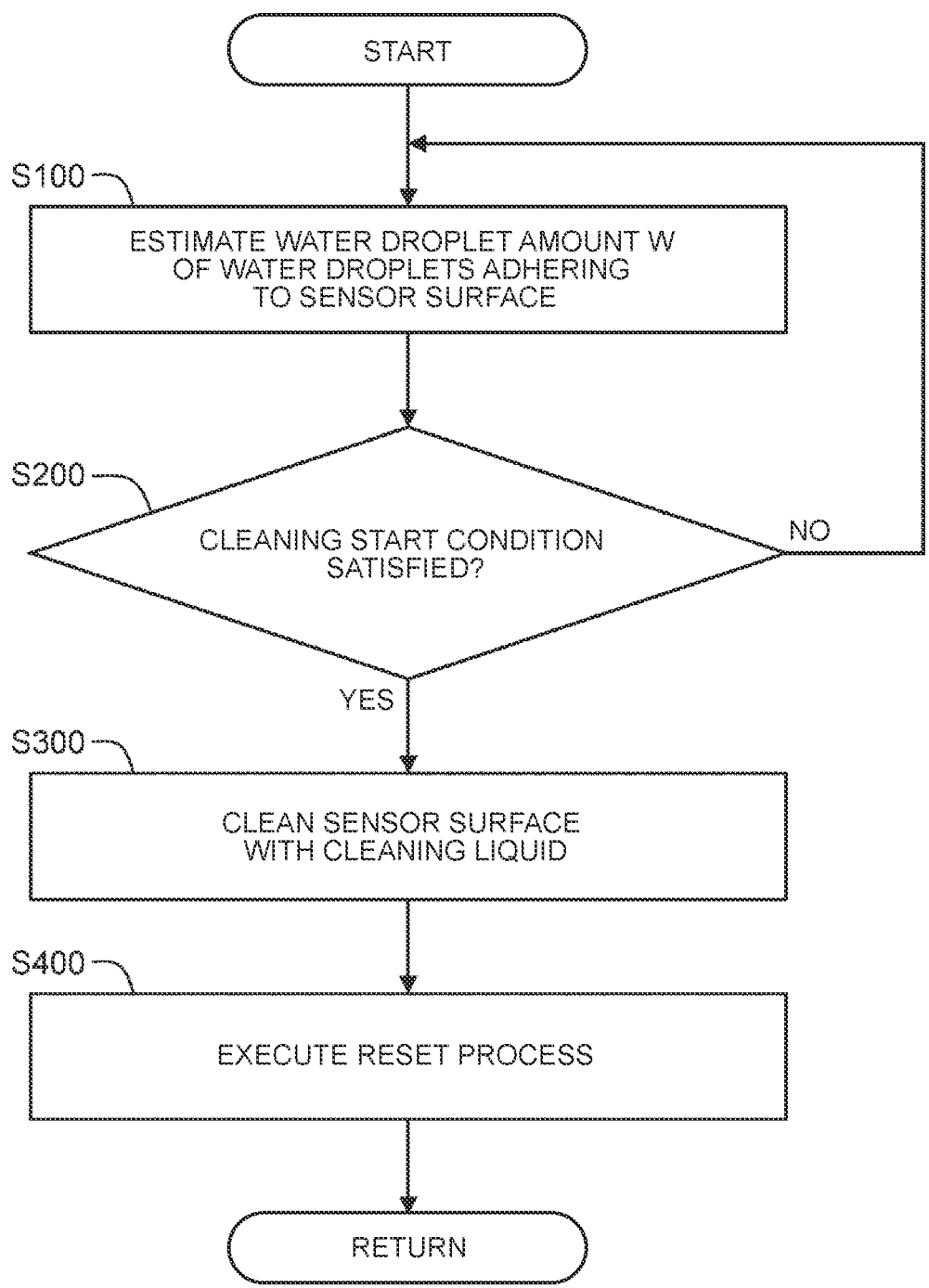
FIG. 8 is a flowchart showing processes executed by the sensor cleaning system according to the embodiment of the present disclosure.

FIG. 8 is a flowchart showing processes by the sensor cleaning system 100 (processor 121) according to the present embodiment.

In step S100, the sensor cleaning system 100 executes an "estimation process" for estimating the water droplet amount W adhering to the sensor surface 10S of the external sensor 10.

In step S200, the sensor cleaning system 100 executes a "determination process" for determining whether the cleaning start condition is satisfied based on the water droplet amount W. In other words, the sensor cleaning system 100 determines whether the water droplet amount W satisfies the cleaning start condition. When the cleaning start condition is not satisfied (step S200; No), the process returns to step S100. On the other hand, when the cleaning start condition is satisfied (step S200; Yes), the process proceeds to step S300.

In step S300, the sensor cleaning system 100 executes the "cleaning process" of cleaning the sensor surface 10S of the external sensor 10 with the cleaning liquid. The cleaning process is executed, for example, for the certain period of time. When the cleaning process is completed, the process proceeds to step S400.

In step S400, the sensor cleaning system 100 executes a "reset process" of resetting the water droplet amount W. After that, the process returns to step S100.

Hereinafter, various examples of the determination process (step S200) will be described.

4-1. First Example

Figure 9:
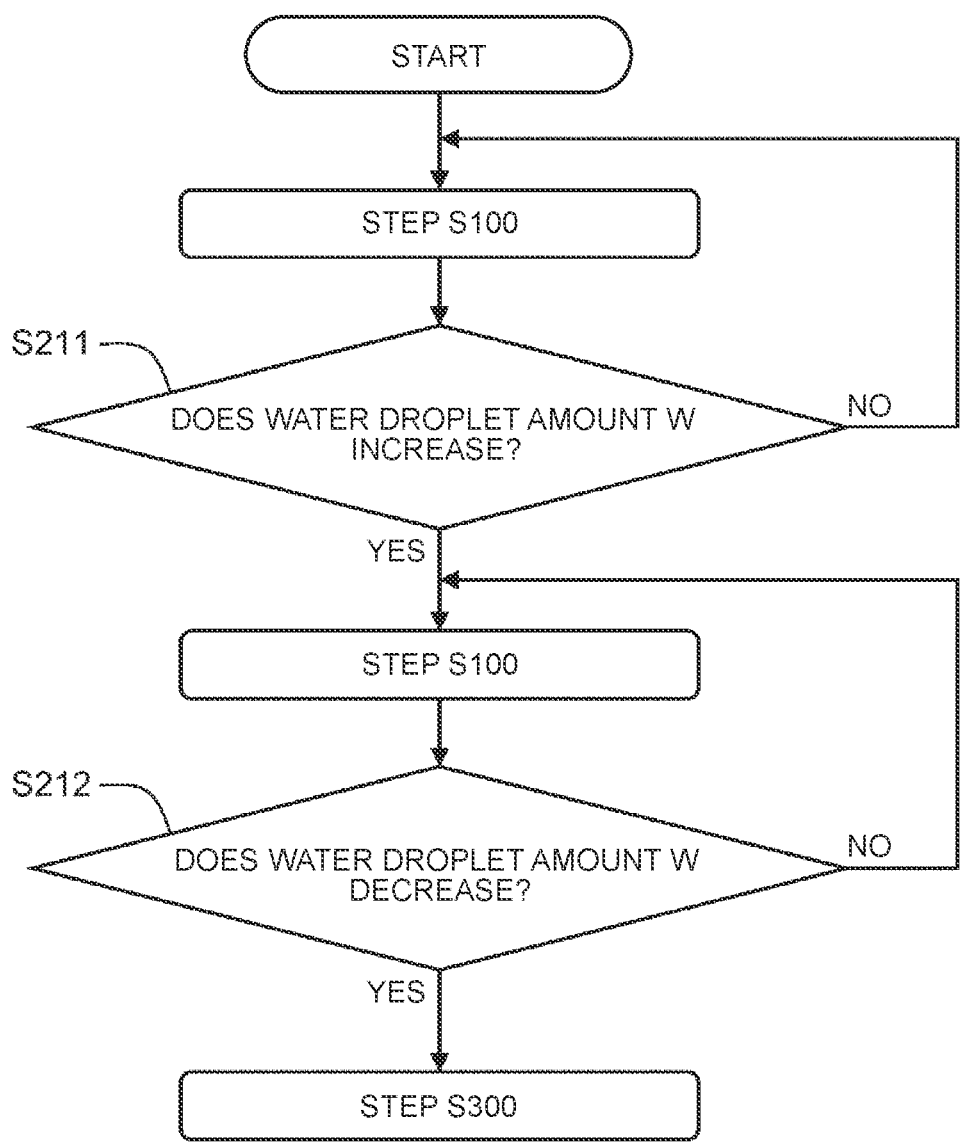
FIG. 9 is a flowchart showing a first example of a determination process (step S200) according to the embodiment of the present disclosure.

FIG. 9 is a flowchart showing a first example of the determination process (step S200). The first example corresponds to the cleaning policy shown in FIG. 3 above.

In step S211, the sensor cleaning system 100 determines whether the water droplet amount W increases from the previous value. When the water droplet amount W does not increase from the previous value (step S211; No), the process returns to step S100. On the other hand, when the water droplet amount W increases from the previous value (step S211; Yes), the process proceeds to step S212 after step S100.

In step S212, the sensor cleaning system 100 determines whether the water droplet amount W decreases from the previous value. When the water droplet amount W does not decrease from the previous value (step S212; No), the process returns to step S100. On the other hand, when the water droplet amount W decreases from the previous value (step S212; Yes), the process proceeds to step S300.

4-2. Second Example

Figure 10:
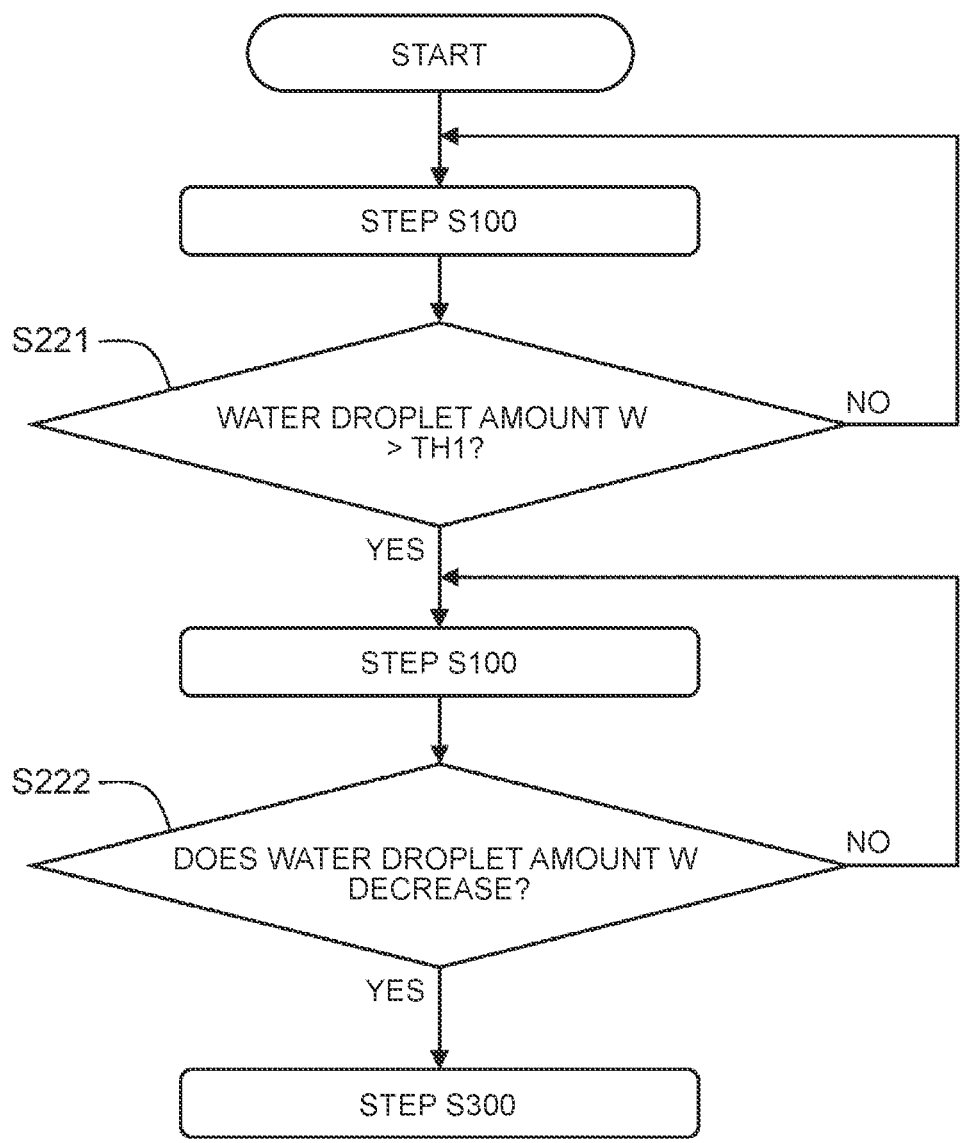
FIG. 10 is a flowchart showing a second example of the determination process (step S200) according to the embodiment of the present disclosure.

FIG. 10 is a flowchart showing a second example of the determination process (step S200). The second example corresponds to the cleaning policy shown in FIG. 4 above.

In step S221, the sensor cleaning system 100 determines whether the water droplet amount W exceeds the first threshold value TH1. The first threshold value TH1 is a value larger than zero. When the water droplet amount W is equal to or less than the first threshold value TH1 (step S221; No), the process returns to step S100. On the other hand, when the water droplet amount W exceeds the first threshold value TH1 (step S221; Yes), the process proceeds to step S222 after step S100.

In step S222, the sensor cleaning system 100 determines whether the water droplet amount W decreases from the previous value. When the water droplet amount W does not decrease from the previous value (step S222; No), the process returns to step S100. On the other hand, when the water droplet amount W decreases from the previous value (step S222; Yes), the process proceeds to step S300.

4-3. Third Example

Figure 11:
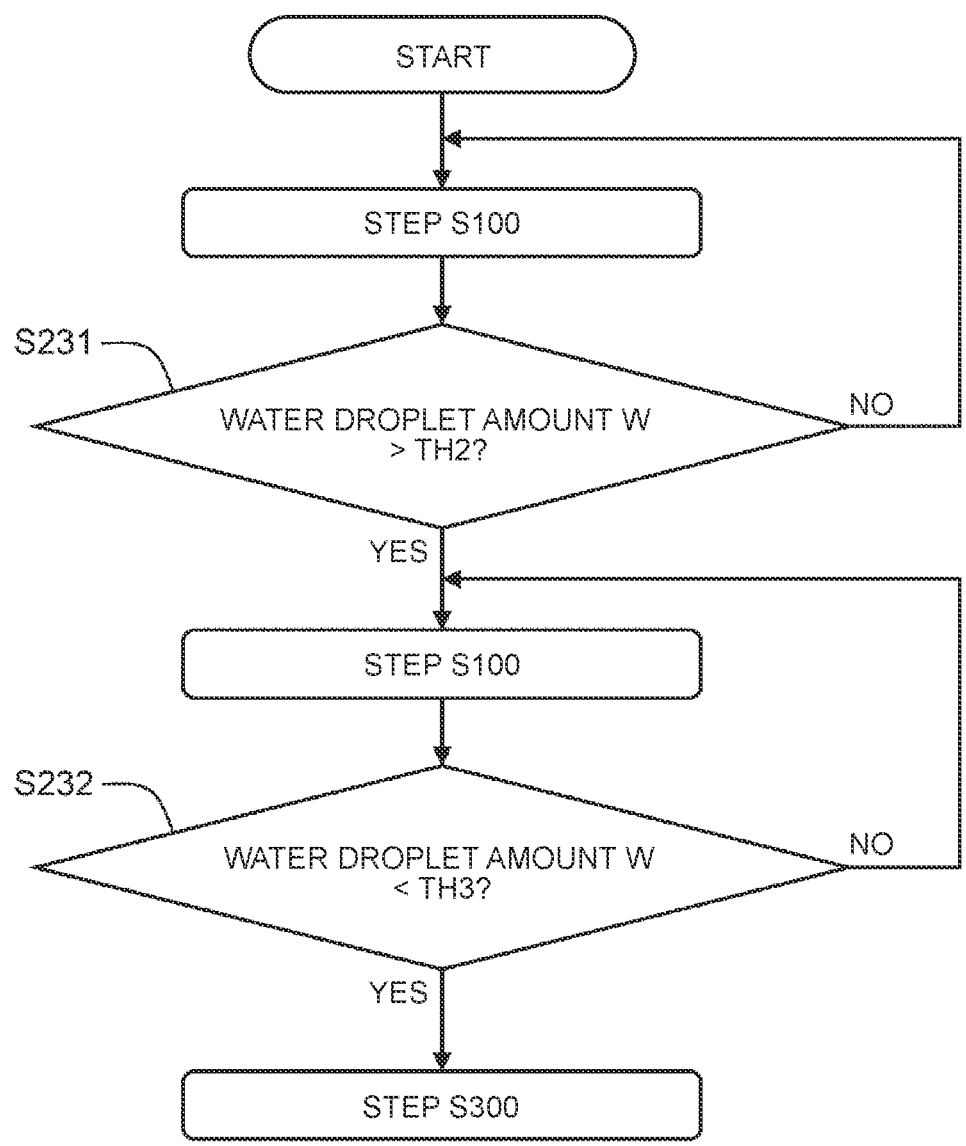
FIG. 11 is a flowchart showing a third example of the determination process (step S200) according to the embodiment of the present disclosure.

FIG. 11 is a flowchart showing a third example of the determination process (step S200). The third example corresponds to the cleaning policy shown in FIG. 5 above.

In step S231, the sensor cleaning system 100 determines whether the water droplet amount W exceeds the second threshold value TH2. The second threshold value TH2 is a value larger than zero. When the water droplet amount W is equal to or less than the second threshold value TH2 (step S231; No), the process returns to step S100. On the other hand, when the water droplet amount W exceeds the second threshold value TH2 (step S231; Yes), the process proceeds to step S232 after step S100.

In step S232, the sensor cleaning system 100 determines whether the water droplet amount W is below the third threshold value TH3. The third threshold value TH3 is a value larger than zero. The third threshold value TH3 may be the same as the second threshold value TH2. The third threshold value TH3 may be smaller than the second threshold value TH2. When the water droplet amount W is equal to or higher than the third threshold value TH3 (step S232; No), the process returns to step S100. On the other hand, when the water droplet amount W is less than the third threshold value TH3 (step S232; Yes), the process proceeds to step S300.

4-4. Fourth Example

Figure 12:
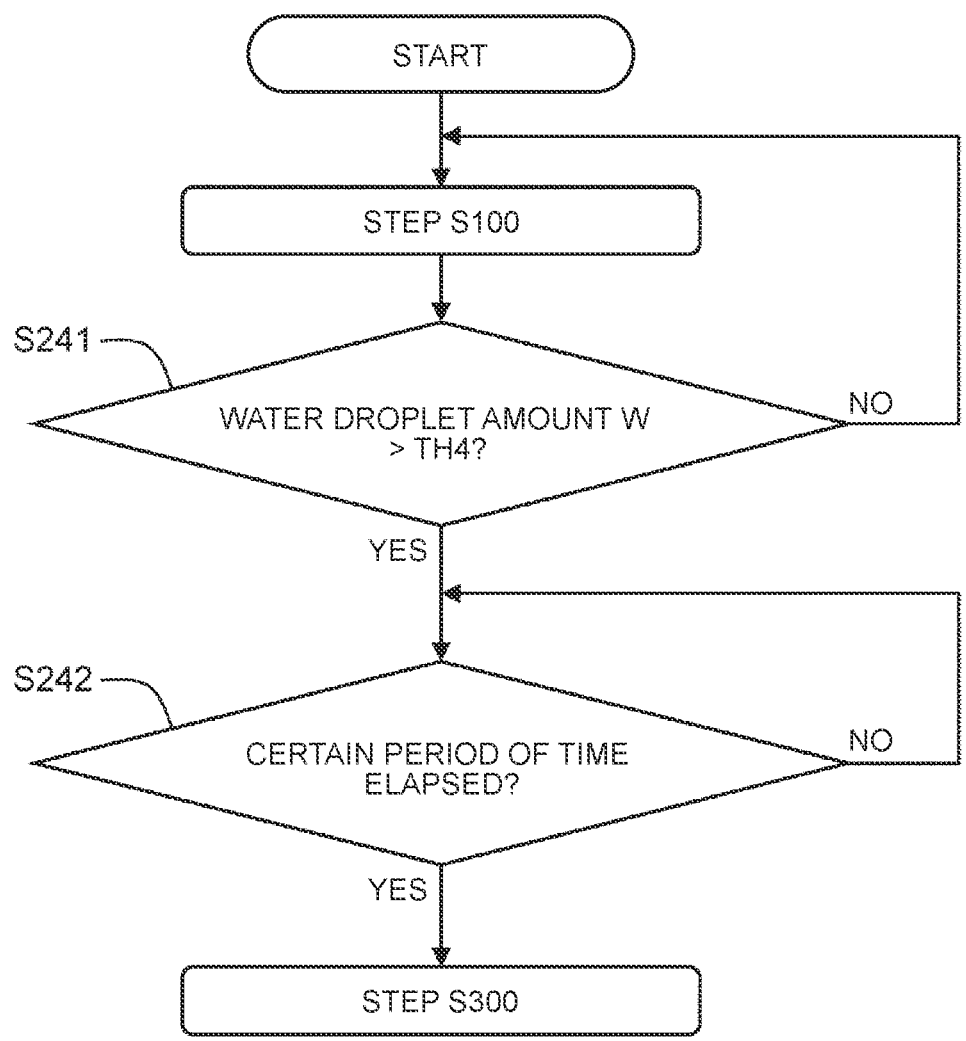
FIG. 12 is a flowchart showing a fourth example of the determination process (step S200) according to the embodiment of the present disclosure.

FIG. 12 is a flowchart showing a fourth example of the determination process (step S200). The fourth example corresponds to the cleaning policy shown in FIG. 6 above.

In step S241, the sensor cleaning system 100 determines whether the water droplet amount W exceeds the fourth threshold value TH4. The fourth threshold value TH4 is a value larger than zero. When the water droplet amount W is equal to or less than the fourth threshold value TH4 (step S241; No), the process returns to step S100. On the other hand, when the water droplet amount W exceeds the fourth threshold value TH4 (step S241; Yes), the process proceeds to step S242.

In step S242, the sensor cleaning system 100 determines whether the certain period of time has elapsed. After the certain period of time has elapsed (step S242; Yes), the process proceeds to step S300.

What is claimed is:

1. A sensor cleaning system that cleans a sensor surface of an external sensor mounted on a vehicle, the sensor cleaning system comprising one or more processors, wherein the one or more processors:
   estimate a water droplet amount of a water droplet adhering to the sensor surface;
   determine whether a cleaning start condition is satisfied based on the water droplet amount; and
   execute a cleaning process, including controlling a pump to supply a cleaning liquid to the sensor surface, of cleaning the sensor surface with the supplied cleaning liquid when the cleaning start condition based on the water droplet amount is satisfied, the cleaning start condition includes a first period in which the water droplet does not dry and the first period is defined by a first time point and a second time point, and a second period in which drying of the water droplet progresses and the second period is defined by the second time point and a third time point, and the cleaning process is executed between the second time point and the third time point.

2. The sensor cleaning system according to claim 1, wherein the cleaning start condition includes that the water droplet amount is currently decreasing after the water droplet amount increases.

3. The sensor cleaning system according to claim 2, wherein the cleaning start condition includes that the water droplet amount changes from an increase to a decrease.

4. The sensor cleaning system according to claim 2, wherein the cleaning start condition includes that the water droplet amount exceeds a first threshold value and then changes from an increase to a decrease.

5. The sensor cleaning system according to claim 2, wherein the cleaning start condition includes that the water droplet amount exceeds a second threshold value and then falls below a third threshold value.

6. The sensor cleaning system according to claim 1, wherein the cleaning start condition includes that a certain period of time elapses after the water droplet amount exceeds a fourth threshold value.

7. The sensor cleaning system according to claim 1, wherein the one or more processors estimate the water droplet amount of the water droplet adhering to the sensor surface based on a measurement result by the external sensor.

8. A sensor cleaning method for cleaning a sensor surface of an external sensor mounted on a vehicle with a cleaning liquid, the method comprising:
   an estimation process of estimating a water droplet amount of a water droplet adhering to the sensor surface;
   a determination process of determining whether a cleaning start condition is satisfied based on the water droplet amount; and
   a cleaning process, including controlling a pump to supply a cleaning liquid to the sensor surface, of cleaning the sensor surface with the supplied cleaning liquid when the cleaning start condition based on the water droplet amount is satisfied, the cleaning start condition includes a first period in which the water droplet does not dry and the first period is defined by a first time point and a second time point, and a second period in which drying of the water droplet progresses and the second period is defined by the second time point and a third time point, and the cleaning process is executed between the second time point and the third time point.

9. A vehicle comprising:
   an external sensor; and
   a sensor cleaning system that cleans a sensor surface of the external sensor with a cleaning liquid, wherein the sensor cleaning system;
   estimates a water droplet amount of a water droplet adhering to the sensor surface,
   determines whether a cleaning start condition is satisfied based on the water droplet amount, and
   executes a cleaning process, including controlling a pump to supply a cleaning liquid to the sensor surface, of cleaning the sensor surface with the supplied cleaning liquid when the cleaning start condition based on the water droplet amount is satisfied, the cleaning start condition includes a first period in which the water droplet does not dry and the first period is defined by a first time point and a second time point, and a second period in which drying of the water droplet progresses and the second period is defined by the second time point and a third time point, and the cleaning process is executed between the second time point and the third time point.

* * * * *